UNITED STATES PATENT OFFICE.

ERNEST NIENSTAEDT, OF NEW YORK, N. Y., ASSIGNOR OF ONE-HALF TO LEO GOLDMARK, OF SAME PLACE.

PROCESS OF WINNING METALS FROM MAGNETIC IRON ORE.

SPECIFICATION forming part of Letters Patent No. 523,680, dated July 31, 1894.

Application filed October 25, 1893. Serial No. 489,123. (No specimens.)

*To all whom it may concern:*

Be it known that I, ERNEST NIENSTAEDT, a citizen of the United States, and a resident of New York, in the county of New York and State of New York, have invented certain new and useful Improvements in Processes of Winning Metals from Magnetic Iron-Sand, Metallic Ore-Dust, and Metallic Residues, of which the following is a specification.

Many attempts have been made to win the metals from magnetic iron sand, metallic ore dust, and metallic residues by the common process applied in the treatment of metallic ores in the blast furnaces, but no success has been obtained up to this time, as almost all metal-containing particles were blown through the chimneys.

My improved process of winning the metals from magnetic iron sand, as well as from metallic ore dust and metallic residues does away with this disadvantage and enables me to extract the metals from the said materials in a very simple and reliable manner. It is evident that my process is of the greatest importance, as thereby the ore dust and metallic residues, which at present are of almost no value, will be rendered very useful, and the extensive fields of magnetic iron sand found all over the United States and in other countries can be converted into valuable and paying districts.

In carrying my invention into effect, I mix the magnetic iron sand, metallic ore dust, or any metallic residues with a quantity of pulverized calcined magnesite. If preferred the iron particles of the magnetic iron sand may be separated from the sand before mixing the same, as described, by means of suitable separators. The quantity of calcined magnesite depends on the chemical conditions of the metallic particles or ores; if *e. g.* the iron particles separated from the sand are used, I take four to five pounds of pulverized calcined magnesite. Then chloride of magnesium is dissolved in water to obtain a solution which contains thirty to eighty per cent. of the chloride of magnesium according to the physical conditions of the iron sand, ore dust, or metallic residues, and about five per cent. glutinous binding material, as starch, dextrine, glue, or flour, is added thereto and thoroughly mingled therewith, so that the solution becomes somewhat pasty, but these binding materials may also be omitted, as they are not absolutely necessary. If starch or glue is used, the solution is heated to the boiling point and then cooled. The solution is then added to the mixture of the iron sand, separated iron particles, metallic residues, or ore dust with the calcined magnesite and intimately combined therewith by agitation, so that the said materials become moist and somewhat glutinous. To the mixture thus obtained I add the flux and reducing materials, as sand, lime, coal dust, and coke, which are generally used in the blast furnace to promote the fusion of metals, in a pulverized state and mix them intimately therewith. The mass thus produced is finally formed into bricks by any suitable contrivances, which bricks, when hardened, are of a firm consistency and can be handled as pieces of ore. It is evident that bricks of any form and shape can be made with the said ingredients, *e. g.* hollow bricks, which have the advantage that the draft in the furnace has a better play than with full bricks.

The bricks are placed into a blast furnace and ignited, and the metals extracted from the bricks without the appliance of any further flux and reducing materials, as such materials are contained in the said bricks. In this manner the process of extracting the metals from the magnetic iron sand, metallic ore dust, and metallic residues is greatly simplified.

Having thus described my invention, I claim as new and desire to secure by Letters Patent—

1. The process of winning metals from magnetic iron sand, or from the magnetic iron particles separated therefrom, or from metallic ore dust, or any metallic residues, which consists in mixing the said materials with calcined magnesite, water, chloride of magnesium, and pulverized flux and reducing materials, as sand, lime, coal dust, coke, forming from the mass thus obtained bricks, and extracting therefrom the metals by the melting process in blast furnaces, substantially as set forth.

2. The process of winning metals from magnetic iron sand, or from the magnetic iron particles separated therefrom, or from metallic ore dust, or any metallic residues, which consists in mixing the said materials with calcined magnesite, water, chloride of magnesium, further with a glutinous binding material, and with pulverized flux and reducing materials, as sand, lime, coal dust, coke, forming from the mass thus obtained bricks, and extracting therefrom the metals by the melting process in blast furnaces, substantially as set forth.

Signed at New York, in the county of New York and State of New York, this 6th day of October, A. D. 1893.

ERNEST NIENSTAEDT.

Witnesses:
CHAS. KARP.
JULIUS ASHER.